(12) United States Patent
Lee et al.

(10) Patent No.: US 6,430,543 B1
(45) Date of Patent: Aug. 6, 2002

(54) CONTROLLED ACCEPTANCE MAIL FRAUD DETECTION SYSTEM

(75) Inventors: David K Lee, Monroe; Leon A. Pintsov, West Hartford; Monroe A. Weiant, Jr., Trumbull, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/195,472

(22) Filed: Nov. 18, 1998

(51) Int. Cl.[7] ............................................. G06F 17/00
(52) U.S. Cl. ............................ 705/60; 705/39; 705/404
(58) Field of Search .............................. 705/60, 71, 63, 705/76, 64, 65, 23, 66, 69, 80, 39, 400–410; 380/227, 228, 229, 232, 233

(56) References Cited

U.S. PATENT DOCUMENTS

| | | | |
|---|---|---|---|
| 4,757,537 A | 7/1988 | Edlemann et al. | 380/24 |
| 4,775,246 A | 10/1988 | Edelmann et al. | 380/23 |
| 4,831,555 A | 5/1989 | Sansone et al. | 364/519 |
| 5,675,650 A | * 10/1997 | Cordery et al. | 380/23 |
| 5,768,132 A | 6/1998 | Cordery et al. | 364/464 |
| 6,249,777 B1 | * 6/2001 | Kara et al. | 705/404 |

FOREIGN PATENT DOCUMENTS

JP 409311962 A * 12/1997

OTHER PUBLICATIONS

Derwent–ACC–No: 2000–115512; WhiteHouse; H.T. Dec. 1999.*

* cited by examiner

*Primary Examiner*—James P. Trammell
*Assistant Examiner*—Pierre E. Elisca
(74) *Attorney, Agent, or Firm*—Steven J. Shapiro; Angelo N. Chaclas

(57) ABSTRACT

A method for processing controlled acceptance mail includes creating, at a first location, a batch of mail including a plurality of mailpieces, each of the plurality of mailpieces having unique indicia data printed thereon which identifies a source of creation of the batch of mail and a unique identifier for a corresponding one of the plurality of mailpieces upon which the unique indicia data is printed; generating, at the first location, a manifest containing all of the unique indicia data for each of the plurality of mailpieces; cryptographically protecting the manifest; sending the cryptographically protected manifest to a second location; verifying the authenticity of the cryptographically protected manifest at the second location; providing the batch of mail to a carrier distribution system for distribution; as part of the carrier distribution system reading unique indicia data from selected mailpieces being distributed therein and sending the unique indicia data for each of the selected mailpieces to the second location; and comparing, at the second location, the unique indicia data received from the carrier distribution system for each of the selected mailpieces with all of the unique indicia data in the manifest to determine if any one of the unique indicia data received from the carrier distribution system matches any of the unique indicia data in the manifest.

9 Claims, 3 Drawing Sheets

FIG. 2
(PRIOR ART)

| SOM# 00001 | MAILER ID 1234 | VAULT ID 1234567 | PIECE COUNT 0001 TO 01410 | MAILER ACCOUNT 775532 |
|---|---|---|---|---|
| DATE 11 APRIL 95 | RATING TABLE 987654 | SIGNATURE 01234567 | ERROR CONTROL 001234321 | |
| WEIGHT(OZ) | SIZE | DISCOUNT | POSTAGE | NUMBER OF PIECES |
| 0.5 | STANDARD | FULL | $0.32 | 731 |
| 1.0 | SURCHARGE | NON-PRESORT | $0.55 | 27 |
| 1.7 | STANDARD | PRE-BARCODED | $0.57 | 567 |
| 1.8 | SURCHARGE | PRESORT | $0.75 | 85 |
| 94.34 LB | TOTALS | | $635.71 | 1410 |

FIG. 3

```
HEADER

SEM FILE SERIAL NUMBER 000000023
MAILER ID 77658954
VAULT ID 3456778
DATE 25-08-1997

GENERAL MAIL FACILITY
10 POSTAL DRIVE
NEW HAVEN, CT 06000

SEM DATA
MAIL PIECE ID RANGE 0000001 TO 0119777
MAIL PIECE SERIAL NUMBER    VAILDATION CODE
   1                            25
   2                            22
   3                            37

0119776                      98
   0119777                      03
```

CONTROLLED ACCEPTANCE MAIL FRAUD DETECTION SYSTEM

FIELD OF THE INVENTION

The present invention relates to mail payment and evidencing systems, and more particularly to a controlled acceptance mail (CAM) fraud detection system.

BACKGROUND OF THE INVENTION

In a high volume production mail system environment, where large batches of mailpieces (i.e. >200 pieces) are produced, the entire batch of mail is required to be directly delivered to a postal clerk at an acceptance facility instead of being deposited in a street letter box. This direct delivery of the batch of mail is referred to as CAM. CAM constitutes over 60% of the mail in the industrial world and consequently the prevention of fraudulent activities which lead to the delivery of unaccounted and unpaid for mailpieces in the CAM environment is considered critical.

U.S. Pat. No. 5,675,650 (hereinafter the '650 patent), which is hereby incorporated by reference, describes a CAM payment and evidencing system which provides a mechanism for detecting counterfeit and duplicate postage indicia. The '650 patent requires a digital postage mark (i.e. postage indicia) to be imprinted on each mailpiece of a particular batch of mail. The digital postage mark includes a digital token (also known as a cryptographic validation code), which is encrypted data that authenticates the value, and other information imprinted on the mailpiece. Examples of system for generating and using digital tokens are described in U.S. Pat. Nos. 4,757,537, 4,831,555, and 4,775,246. The digital tokens are uniquely associated with the individual mailpiece data such that the printing of counterfeit indicia is easily detectable by a standard verification procedure.

In addition to the imprinting of a digital token on each mailpiece, the system described in the '650 patent also requires that the batch of mail be delivered together with a statement of mailing (SOM) which identifies the number of mailpieces in the batch by weight and postage categories as well as the totals for batch weight, batch postage, and number of mailpieces in the batch. The SOM, which is created by the mailing device, is cryptographically signed so that its authenticity and data integrity can be validated. The SOM therefore allows the postal clerk, upon receipt of the SOM and the batch of mail, to first validate the SOM and then weigh the total batch to verify if its weight matches the total weight in the SOM. If there is a significant discrepancy (e.g. a difference larger than a pre-defined threshold) this may indicate that there are unpaid and unaccounted for mailpieces in the batch of mail submitted for acceptance. This process helps to detect if mail items carrying copied valid indicia have been included in the batch of mail. Moreover, by using sampling techniques an estimated weight distribution of the sample of mail from the batch of mail can be compared to an actual weight distribution obtained from the SOM in order to detect substitution of high weight mailpieces by multiple lower weight mailpieces. Thus, for example, the sampling is directed to detection of the substitution of ten 0.1 ounce mailpieces with fraudulent digital postage marks in lieu of a single 1 ounce mailpiece carrying a legitimate 32 cents payment.

While the system of the '650 patent certainly improves the ability to detect unpaid and unaccounted for mailpieces in a CAM environment, it still has certain deficiencies. From a practical viewpoint, the key management infrastructure needed to implement the digital token during individual mailpiece generation and for the token verification process is quite costly and negatively impacts the effectiveness of the entire mailpiece processing system. Moreover, the trustworthiness of the SOM/weighting parameter process depends on the integrity of the postal clerk charged with the responsibility of verification of CAM. Unscrupulous postal clerks, who in exchange for compensation, accept mailings without any verification (referred to as a collusion attack) represent significant danger to the integrity of the CAM postal payment system. That is, once the unverified CAM mailing has been accepted and sorted into individual mailpieces they are delivered within a few days leaving no trace of the fraud (collusion activity). While the individual mailpieces still have the encrypted digital postage mark which can be used to detect counterfeit marks, its use for detecting fraudulently copied authentic indicia is minimized by the massive infrastructure that would have be created to support its use for that purpose.

Accordingly, what is needed is a method and system for detection of a collusion attack in a CAM environment. It is also desirable that such method and system be flexible, economically justifiable and avoid the employment of hardware as much as possible.

SUMMARY OF THE INVENTION

The instant invention overcomes the deficiencies of the prior art by providing a method for processing controlled acceptance mail that includes creating, at a first location, a batch of mail including a plurality of mailpieces, each of the plurality of mailpieces having unique indicia data printed thereon which identifies a source of creation of the batch of mail and a unique identifier for a corresponding one of the plurality of mailpieces upon which the unique indicia data is printed; generating, at the first location, a manifest containing all of the unique indicia data for each of the plurality of mailpieces; cryptographically protecting the manifest; sending the cryptographically protected manifest to a second location; verifying the authenticity of the cryptographically protected manifest at the second location; providing the batch of mail to a carrier distribution system for distribution; as part of the carrier distribution system reading unique indicia data from selected mailpieces being distributed therein and sending the unique indicia data for each of the selected mailpieces to the second location; and comparing, at the second location, the unique indicia data received from the carrier distribution system for each of the selected mailpieces with all of the unique indicia data in the manifest to determine if any one of the unique indicia data received from the carrier distribution system matches any of the unique indicia data in the manifest.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 2 is a conventional SOM;

FIG. 3 is a secure electronic manifest (SEM);

DETAILED DESCRIPTION OF THE PRESENT INVENTION

Figure 1:
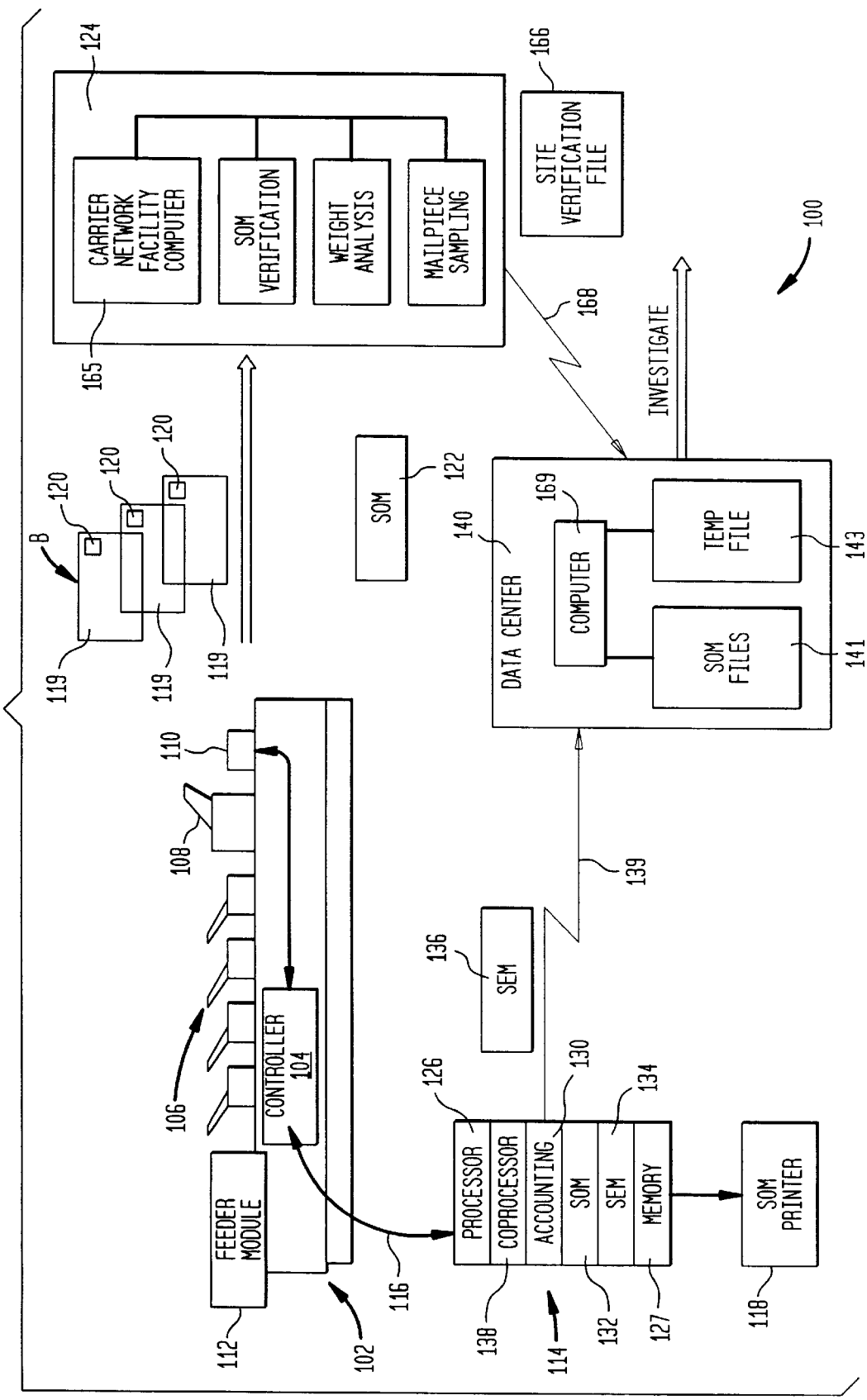
FIG. 1 is a schematic diagram of the inventive system.

FIG. 1 shows the inventive CAM fraud detection system at 100. System 100 includes an inserter system 102 (or other mail generation and/or finishing system) having a computer controller 104. The controller, for example, 104 controls both a plurality of feeder modules (or other mechanical modules) shown generally at 106, an envelope insertion module 108 and a printer 110. The controller 104 is further connected to a control document feeder module 112 and to a vault subsystem 114 by means of a bi-directional communication channel 116. The vault 114 is operatively connected to a non-secure report printer 118 used to print a statement of mailing (SOM).

In operation, under control of the inserter controller 104, control documents are fed from the control document feeder module 112 onto the inserter transport (not shown). The control document determines the operation of the various feeder modules 106 to selectively feed inserts onto the transport to be assembled into a collation and inserted into an envelope fed from the envelope feeder 108. An assembled mailpiece, not shown, when it reaches printer 110 has an address printed on the envelope. The assembled mailpiece is then fed to printer 110 where a digital postage mark (DPM) (or indicia) is imprinted thereon. Subsequent to the printing of the DPM, the individual mailpieces 119, each having a unique DPM 120, are sent as a batch of mail "B" together with a SOM 122 to a carrier network facility 124 (in this case the postal service) for acceptance.

The vault 114 includes a processor 126 which executes programs stored in memory 127 to account within conventional accounting circuitry 130 for funds dispensed by the printing of the DPM'S 120 on the mailpieces 119. The processor 126 also executes a SOM program 132 and a secure electronic manifest (SEM) program 134 to respectively generate the SOM 122 and SEM 136 electronic files for a specific batch of mail "B". The SEM 136, which is discussed in more detail below, and the SOM 122 are both digitally signed in a conventional manner using a secure crytographic coprocessor 138. The SOM 122 can be printed, if desired, by the printer 118 while an electronic file of the SEM is sent by a telecommunications network 139 to a data center 140.

FIG. 2 shows a SOM 122 that includes a file serial number 704, a mailer identification number 706, a vault identifier 708 and a mailer account number 710. A piece count for the batch of mail "B" is also provided at 712. The SOM 122 may also include the date of submission 714 and identification of the rating table used at 716. A digital signature 718 is also provided for the particular batch of mail "B" together with an error control code 720 which code facilitates error detection and correction when machine reading the SOM 122 at the carrier facility 124.

SOM 122 further contains information about groups of mailpieces within the batch "B" of mail which are similar in weight, size, discount, and postage. For example, on line one at 722, 731 standard pieces of mail at 0.5 ounces have a DPM of 32 cents imprinted thereon. Similarly, other groups of mailpieces having common characteristics are shown in subsequent lines of the SOM 122. In the last line of the SOM 122 totals for the entire batch of mail "B" including weight 724, postage 726, and mailpieces 728 are shown.

Because the SOM 122 is digitally signed at 718, all of the data contained therein cannot be undetectably altered. This provides a method for verifying the integrity of the data in SOM 122.

As previously discussed the system described in the '065 patent uses the SOM 122 to detect copied and counterfeited mailpieces at the delivery point of the batch of mail. However in the case of collusion, where no acceptance and verification procedure takes place, such detection is not possible. In this situation the mailer prepares fraudulent mailpieces and submits them (presumably together with genuinely paid for mailpieces) to a postal clerk at the acceptance facility who has been recruited to participate in the fraudulent activity. Since the postal clerk accepts the mailpieces without verification, the fraudulent mailpieces enter the mailstream without detection. The '650 system does provide for sampling of the mailpieces downstream of the acceptance facility. The sampling involves reading the encrypted indicia and verifying if it is authentic since the encrypted indicia contains within itself all of the information needed for verification. While this sampling helps in the detection of simply counterfeited mailpieces, it does not detect fraudulently copied mailpieces. Thus, the most rational course of action for the dishonest mailer is to prepare copies of legitimately paid for mailpieces in the hope that detection of such copied mailpieces would be extremely difficult to find downstream of the acceptance facility.

The invention of claim 1 overcomes the deficiencies of the '650 patent by creating and sending for each batch of mail "B" the SEM 136. Preferably the SEM 136 is sent electronically to the carrier data center 140 (and a provider data center (not shown) for redundancy purposes (if desired)) which is remotely located from both the inserter system 102 and the carrier facility 124 to which the batch of mail "B" is delivered. However, the SEM 136 could alternatively be a printed document or other tangible medium within which information can be conveyed, such as for example a CD ROM or a floppy diskette.

Referring to FIG. 3, the SEM 136 is shown in detail to include header information 142 which includes a SEM file serial number 144, a mailer ID 146, a vault ID 148, the date 150 of the submission of the batch of mail "B", and the address and postal code 152 of the carrier facility 140 at which the batch of mail "B" is delivered. A second portion of the SEM file 136 includes specific SEM data 154 associated with a particular batch of mail "B". SEM data 154 includes a mailpiece ID range 156 which identifies the mailpiece serial counter range of all of the mailpieces 119 in the batch of mail "B", each individual mailpiece serial number 158, and a corresponding randomly generated validation code 160 specifically associated with each mailpiece serial number 158. Although not shown, vault 114 includes a random number generator to generate and associate the randomly generated validation code 160 with a specific mailpiece serial number 158. Thus, the SEM 136 creates a record for each individual mailpiece 119 included as part of the batch of mail "B".

In order to ensure that the SEM 136 is capable of being verified at the data center 140 as being authentic and not altered, it is digitally signed in a known manner using a private key stored in memory 127. Moreover, attached to the SEM 136 is a public key certificate, which is the public key of the specific inserter 102 (or more generally the specific mailer) that has been signed using the private key of the carrier. Accordingly, when the data center 140 receives the SEM 136 together with the certificate, all it needs is its own public key to obtain the public key of the inserter 102 from the certificate. The public key of the inserter 102 is then used to verify the authenticity and data integrity of the SEM 136 by ascertaining that the digital signature attached to the SEM 136 is correct.

It is to be noted that the amount of memory required for the SEM 136 for the entire batch of mail "B" is not excessively large and therefore very affordable. For example, a high speed inserter 102 operating at 15,000 mailpieces an hour produces 120,000 mailpieces 119 during a single 8 hour shift. The amount of memory required for the information associated with each mailpiece 119 is approximately 10 bytes. Thus, the total memory required for the 120,000 pieces is 1.2 megabytes plus some minimal memory overhead for the digital signature and the certificate for the inserter 102 public key. All of the information for each mailpiece 119 is stored in the non-volatile memory 127 of vault 114. After all 120,000 mailpieces 119 have been prepared, the SEM 136 is digitally signed and sent to data center 140 together with the certificate of the inserter's public key. In the event the mailing operation employs more than one inserter system 102, then the SEM'S for the combined mailings can be produced by combining the SEM'S 136 for each of the individual inserters 102. The combining process verifies the signatures of each of the individual SEM'S 136 before merging them into a single file which is signed by the private key of a public key cryptosystem.

Since the data in the SEM 136 is highly repetitive, it can be compressed to minimize the amount of memory 127 that is needed. In the foregoing of 120,000 mailpieces 119, the vault ID 148 is the same for each mailpiece 119 and the mailpiece serial number 158 is sequential. Therefore the SEM 136 may be compressed to a range of serial numbers (approximately 10 bytes) plus the vault ID 148 (4 bytes) plus 120K bytes for validation codes 160 making the total storage requirement including the signature and certificate in the order of hundreds of kilobytes.

Figure 4:
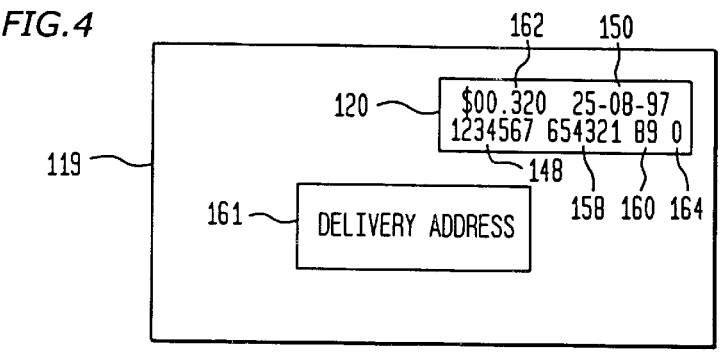
FIG. 4 is a mailpiece including a digital postage mark for the inventive system.

Referring to FIG. 4, an enlarged view of a single mailpiece 119 having an address block 161 and the digital postage mark 120 is shown. In the instant invention the digital postage mark 120 includes the mailpiece serial number 158, the vault ID 148, the validation codes 160, the date 150 of submission, and optionally the postage amount 162 and an error detection code 164. The digital postage mark 120 while shown in alphanumeric form can also be in a bar code format (linear or two dimensional) or both.

Figure 5:
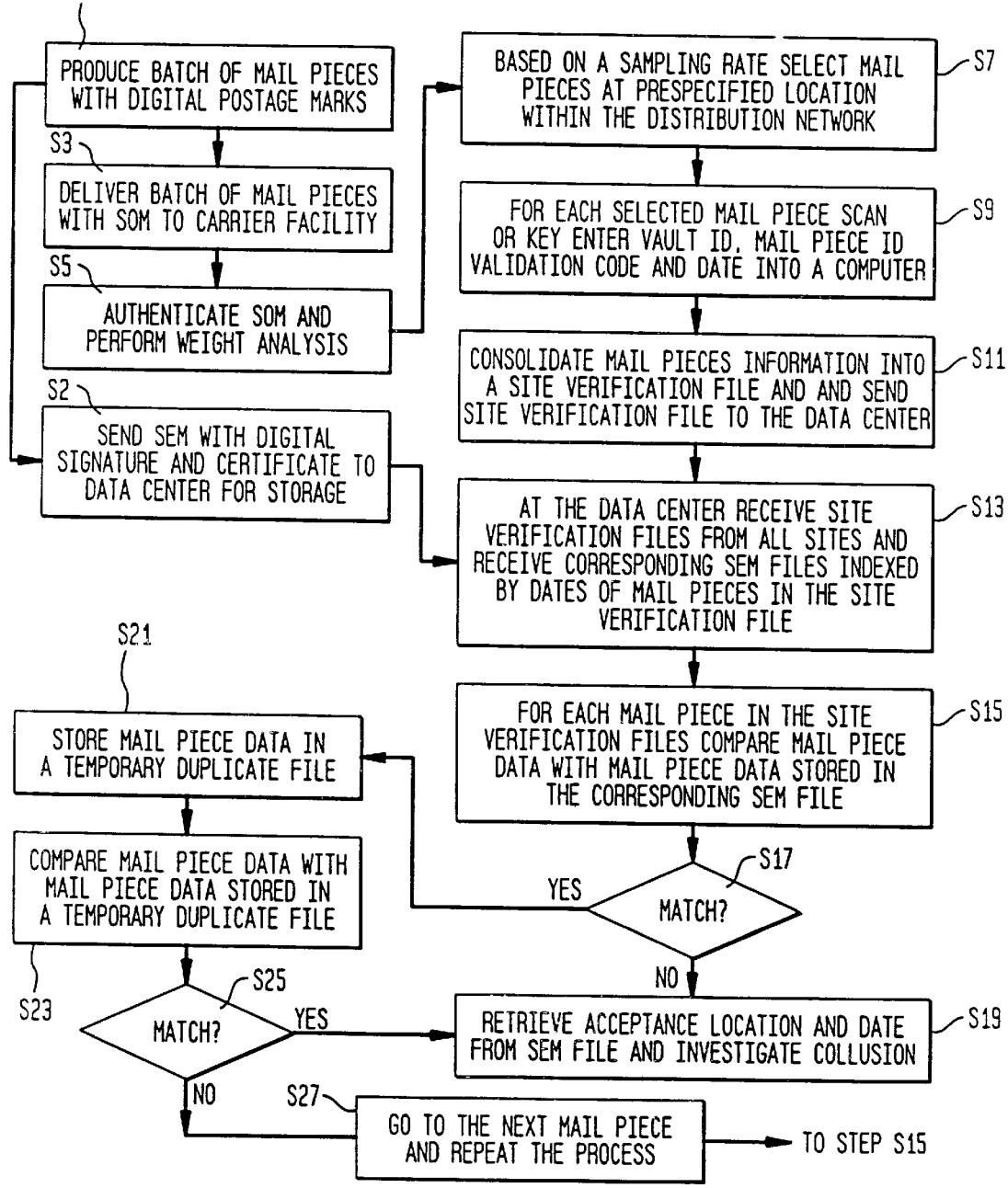
FIG. 5 is a flow chart showing the operational processes of the inventive system.

Referring to FIGS. 1 and 5, the operation of the inventive system 100 will be described. At step S1 the inserter system 102 produces a batch of mail "B" including individual mailpieces 119 which each have a digital postage mark 120 thereon. The batch of mail "B" is delivered together with the SOM 122 to the carrier network facility 124 (step S3) where a postal clerk authenticates the SOM 122 and performs a total weight and weight distribution analysis for the batch of mail "B" as described in the '650 patent (step S5) to attempt to detect unaccounted and unpaid for mailpieces. Next, either at the network facility 124 (or at another location within the carrier network), individual mailpieces 119 are selected based on a sampling rate for further analysis (step S7). For each selected mailpiece the vault ID 148, mailpiece serial number 158, validation code 160, and date 150 are either read from the digital postage mark 120 and entered via a keyboard into a computer 165 residing at the sampling location or are directly scanned off the mailpiece 119 and directly sent to the aforementioned computer 165 (step S9). At each site where mailpiece sampling is done, a site verification file 166 is compiled containing all of the information obtained from the digital postage marks 120 of the sampled mailpieces 119. The site verification file 166 is preferably sent via a telecommunications network 168 to the data center 140 (step S11).

Returning to step S1, at the time the SOM 122 is created, the SEM 136 is also created within the vault 114. The SEM together with a digital signature and a public key certificate are sent via the communications network 139 to the data center 140. The individual SEM 136 files are stored within an SOM database 141 within the data center 140 (step S2). At the data center 140, corresponding SEM files 136 for each mailpiece 119 in the verification file 166 are retrieved by the data center computer 169 based on the vault ID148 and the date of mailing 150 (step S13). At step S15, the computer 169 compares the digital postage mark data 120 for each mailpiece 119 in the verification file with the mailpiece 119 data in the corresponding SEM file 136. If at step S17 a determination is made that there is no SEM 136 matching data, an investigation is initiated at step S19 to investigate if fraudulent activity occurred; including the possibility of collusion. On the other hand, if the answer to the inquiry at step S17 is "YES", the individual mailpiece data is stored in a temporary file 143 in data center 140(step S21). The current mailpiece data is then compared to the other individual mailpiece data stored in the temporary file 143 to determine if a duplicate mailpiece 119 with the same digital postage mark 120 has previously been received by the data center 140 (step S23). If at step S25 the comparison of step S23 is "YES", it is likely that a fraudulently copied valid mailpiece 119 has been detected and the process proceeds to step S19 for further investigation. If however the inquiry at step S25 is "NO" the mailpiece 119 is considered valid and the entire process is repeated for the next sampled mailpiece 119 (step S27).

The invention described above provides a significant improvement over other known controlled acceptance mail systems because the digital postage mark 120 is not required to be cryptographically protected data. Accordingly, as compared to the encrypted indicia of the '650 patent the automatic scanning and reading of the digital postage mark 120 is more reliable. That is, the encrypted indicia of the '650 patent requires more data to be printed as part of the indicia to permit verification to occur. However, the more data, which needs to be scanned the more, the chance of a reading error is likely to occur. Additionally, the claimed invention has the additional advantage in that only the SEM 136 is digitally signed. In the '650 patent each individual mailpiece has an encrypted indicia which requires more processing time to achieve than does only signing the SEM 136.

While the present invention has been disclosed and described with reference to a single embodiment thereof, it will be apparent, as noted above that variations and modifications may be made therein. For example, while an inserter 102 is shown, any mail generation device such as a conventional mailing machine or a postage meter can be used to generate the batch of mail "B". Furthermore, while the preferred embodiment refers to a digital postage mark, the invention disclosed herein is not limited to a postal service but is applicable for any similar type of carrier network. Accordingly, the term "indicia data" as used herein refers to any carrier's mark which may be applied to the mailpieces for use in the carriers CAM processing system. Additionally, where payment is to be made through the use of permit mail or at a third party location as set forth in U.S. Ser. No. 08/629,719 filed on Apr. 9, 1996, the vault will not have postage funds stored therein and a postage amount associated with each mailpiece can optionally be provided as part of the digital postage mark 120.

What is claimed is:

1. A method for processing controlled acceptance mail comprising the steps of:

creating, at a first location, a batch of mail including a plurality of mailpieces, each of the plurality of mailpieces having unique indicia data printed thereon which identifies a source of creation of the batch of mail and a unique identifier for a corresponding one of the plurality of mailpieces upon which the unique indicia data is printed;

generating, at the first location, a manifest containing all of the unique indicia data for each of the plurality of mailpieces;

cryptographically protecting the manifest;

sending the cryptographically protected manifest to a second location;

verifying the authenticity of the cryptographically protected manifest at the second location;

providing the batch of mail to a carrier distribution system for distribution;

as part of the carrier distribution system reading unique indicia data from selected mailpieces being distributed therein and sending the unique indicia data for each of the selected mailpieces to the second location; and comparing, at the second location, the unique indicia data received from the carrier distribution system for each of the selected mailpieces with all of the unique indicia data in the manifest to determine if any one of the unique indicia data received from the carrier distribution system matches any one of the unique indicia data in the manifest.

2. A method as recited in claim 1, wherein at times when a match exists between any of the unique indicia data received from the carrier distribution system and the unique indicia data in the manifest the matching unique indicia data received from the carrier distribution system is stored as file data in a file at the second location.

3. A method as recited in claim 2, wherein at times when a match exists between any of the unique indicia data received from the carrier distribution system and the unique indicia data in the manifest the matching unique indicia data received from the carrier distribution system is compared to the file data in the file at the second location to determine if any of the file data in the file matches any of the matching unique indicia data received from the carrier distribution system.

4. A method as recited in claim 1, further comprising the step of generating a random validation code for each of the plurality of mailpieces at the first location and including the random validation code as part of the unique indicia data for each of the plurality of mailpieces.

5. A method as recited in claim 1, wherein the cryptographically protected manifest is electronically sent to the second location.

6. A method as recited in claim 5, wherein the unique indicia data for the selected mailpieces is electronically sent from the carrier distribution system to the second location.

7. A method as recited in claim 6, further comprising the steps of 1) generating a statement of mailing at the first location which statement of mailing contains the total weight of the batch of mail, the total payment for the batch of mail, and a mailer identification all of which are digitally signed forming a digital signature which is included as part of the statement of mailing; 2) sending the statement of mailing to the carrier distribution system; and 3) determining an actual weight of the batch of mail at the carrier distribution system and verifying the actual weight in comparison to the total weight set forth in the statement of mailing.

8. A method as recited in claim 1, wherein the unique indicia data printed on each mailpiece is non-cryptographically protected data.

9. A method for processing controlled acceptance mail comprising the steps of:

at a carrier distribution facility which is part of a carrier distribution system receiving from a first location 1) a batch of mail including a plurality of mailpieces, each of the plurality of mailpieces having unique indicia data printed thereon which identifies a source of creation of the batch of mail and a unique identifier for a corresponding one of the plurality of mailpieces upon which the unique indicia data is printed;

receiving at a second location a cryptographically protected manifest containing all of the unique indicia data for each of the plurality of mailpieces;

verifying the authenticity of cryptographically protected manifest at the second location;

as part of the carrier distribution system reading unique indicia data from selected mailpieces being distributed therein and sending the unique indicia data for each of the selected mailpieces to the second location; and comparing, at the second location, the unique indicia data received from the carrier distribution system for each of the selected mailpieces with all of the unique indicia data in the manifest to determine if any one of the unique indicia data received from the carrier distribution system matches any one of the unique indicia data in the manifest.

* * * * *